(12) United States Patent
Roh (10) Patent No.: US 10,330,327 B2
(45) Date of Patent: Jun. 25, 2019

(54) FLUID CIRCULATION TYPE HEATING DEVICE PROVIDED WITH OVERPRESSURE PROTECTION ELEMENT

(71) Applicant: MIM CERAMICS CO., LTD., Asan-si, Chungcheongnam-do (KR)

(72) Inventor: In Hwa Roh, Seoul (KR)

(73) Assignee: MIM CERAMICS CO., LTD., Asan-si, Chungcheongnam-do (KR)

( * ) Notice: Subject to any disclaimer, the term of this patent is extended or adjusted under 35 U.S.C. 154(b) by 0 days.

(21) Appl. No.: 15/738,235

(22) PCT Filed: Jun. 21, 2016

(86) PCT No.: PCT/KR2016/006566
§ 371 (c)(1),
(2) Date: Dec. 20, 2017

(87) PCT Pub. No.: WO2016/208936
PCT Pub. Date: Dec. 29, 2016

(65) Prior Publication Data
US 2018/0187903 A1 Jul. 5, 2018

(30) Foreign Application Priority Data

Jun. 24, 2015 (KR) .......................... 10-2015-0090012

(51) Int. Cl.
*F24H 1/14* (2006.01)
*A61F 7/08* (2006.01)
(Continued)

(52) U.S. Cl.
CPC .......... *F24D 19/1054* (2013.01); *F16K 17/04* (2013.01); *F24D 3/02* (2013.01);
(Continued)

(58) Field of Classification Search
CPC ...... F24D 1/005; F24D 13/04; F24D 2220/08; Y02B 30/26; A61F 2007/0054; A61F 7/0097; A61F 7/08
See application file for complete search history.

(56) References Cited

U.S. PATENT DOCUMENTS 9,687,386 B2 * 6/2017 Carson ...................... A61F 7/10
2011/0315252 A1 * 12/2011 Oh .......................... F04B 19/24
137/564

(Continued)

FOREIGN PATENT DOCUMENTS

JP 07-294000 A 11/1995
JP 11-173609 A 7/1999
(Continued)

*Primary Examiner* — Gregory A Wilson
(74) *Attorney, Agent, or Firm* — Rabin & Berdo, P.C.

(57) ABSTRACT

The present invention relates to a fluid circulation type heating device which circulates fluid by means of heating and cooling and, more particularly, to a fluid circulation type heating device provided with overpressure protection element which can prevent pressure increase of a circulation path of a fluid. The fluid circulation type heating device according to the present invention for achieving the aforementioned purpose comprises a circulation line, a heat radiation member installed on the circulation line, a boiler which heats and expands a fluid, a storage tank which stores the fluid therein and supplies the same to the boiler, a controller which controls the boiler, and a housing which accommodates the boiler and the controller. In addition, the device has an opening formed in fluid communication with the storage tank or the circulation line, and further comprises an overpressure protection element which blocks the opening, wherein the overpressure protection element is configured to prevent fluid from passing through and allowing a vapor of the fluid to pass through, thereby dropping the pressure of the storage tank and the circulation line. The
(Continued)

fluid circulation type heating device according to the present invention discharges, to the outside, steam from the inside of a circulation path and does not discharge fluid to the outside, thereby preventing overpressure loaded onto the fluid circulation path of a heating device. In addition, should the heating device fall over, it is possible to prevent fluid from being discharged to the outside. Furthermore, it is possible to prevent external foreign material from being introduced into the circulation path, thereby preventing damages of components or generation of odor, due to contamination of fluid caused from the external foreign material.

7 Claims, 6 Drawing Sheets

(51) Int. Cl.
| | | |
|---|---|---|
| F24D 19/10 | (2006.01) | |
| F24D 3/10 | (2006.01) | |
| F24D 19/08 | (2006.01) | |
| F24D 3/02 | (2006.01) | |
| F24D 3/12 | (2006.01) | |
| F24H 1/08 | (2006.01) | |
| F24D 3/14 | (2006.01) | |
| F16K 17/04 | (2006.01) | |

(52) U.S. Cl.
CPC ............. *F24D 3/10* (2013.01); *F24D 3/1041* (2013.01); *F24D 3/122* (2013.01); *F24D 3/14* (2013.01); *F24D 19/08* (2013.01); *F24D 19/083* (2013.01); *F24D 19/087* (2013.01); *F24D 19/10* (2013.01); *F24H 1/08* (2013.01); *F24D 2220/025* (2013.01); *F24D 2220/0214* (2013.01); *Y02B 30/24* (2013.01)

(56) References Cited

U.S. PATENT DOCUMENTS

| | | | | |
|---|---|---|---|---|
| 2015/0176847 | A1* | 6/2015 | Shin | ........................ F24H 1/121 |
| | | | | 237/69 |
| 2016/0348942 | A1* | 12/2016 | Kim | ........................ F24H 9/122 |

FOREIGN PATENT DOCUMENTS

| | | |
|---|---|---|
| KR | 10-0312643 B1 | 12/2001 |
| KR | 10-2009-0082986 A | 8/2009 |
| KR | 10-2010-0028169 A | 3/2010 |
| KR | 10-1033668 B1 | 5/2011 |
| KR | 10-1038576 B1 | 6/2011 |
| KR | 10-1347990 B1 | 1/2014 |

\* cited by examiner

FLUID CIRCULATION TYPE HEATING DEVICE PROVIDED WITH OVERPRESSURE PROTECTION ELEMENT

TECHNICAL FIELD

The present invention relates to a fluid circulation type heating device which circulates a fluid by heating and cooling the fluid and, more particularly, to a fluid circulation type heating device provided with an overpressure preventing element, which can prevent a pressure increase in a circulation path of a fluid.

BACKGROUND ART

As an auxiliary heating means for heating a living space or the like, an electric blanket, an electric pad and the like are mainly used. However, in the case of electric devices such as an electric blanket and an electric pad, electromagnetic waves are generated together with an electric field from a heating wire through which an electric current flows. Continuous exposure to such electromagnetic waves is harmful to a human body.

In order to reduce the direct or indirect damage due to the electromagnetic waves generated in an electric blanket or an electric pad, there has been devised a fluid circulation type heating device in which a heated high-temperature fluid is circulated through a pipe surrounded by a heat dissipation member such as a blanket or pad.

For example, Korean Patent Publications Nos. 1038576, 0312643 and 1033668 disclose a fluid circulation type heating device of the type in which a fluid heated by a channel heater is circulated by using a circulation pump, and a fluid circulation type heating device of the type in which a fluid is circulated by a pressure generated due to vaporization of a fluid.

In such a fluid circulation type heating device, when a fluid, for example, water is heated, a part of the water becomes a vapor, thereby increasing and the internal pressure of a water circulation path. If the fluid circulation path is sealed, a pump, a check valve, etc. may be damaged due to an increase in the internal pressure, or the weakest part of the fluid circulation path may be damaged. Therefore, it is necessary to discharge the vapor to the outside. In the conventional fluid circulation type heating device, a part of a storage tank for storing a fluid is opened in order to prevent an increase in pressure. However, in such a case, if the device falls, the water in a water tank may be spilled out. In extreme cases, a user may be burned by spilled hot water. In addition, when foreign substances such as dust or the like are introduced into the water tank through the opened part, the pump, the check valve and the like may be damaged by the foreign substances.

SUMMARY OF THE INVENTION

The present invention has been made to solve the above-mentioned problems. It is an object of the present invention to provide a fluid circulation type heating device capable of selectively discharging only a vapor and preventing an increase in the pressure inside a fluid circulation path while preventing external contaminants from flowing into the fluid circulation path and preventing a fluid from being discharged to the outside.

According to an embodiment of the present invention, there is provided a fluid circulation type heating device comprising a circulation line, a heat dissipation member installed on the circulation line, a boiler configured to heat and expand a fluid, a storage tank configured to store the fluid and supply the fluid to the boiler, a controller configured to control the boiler, and a housing configured to accommodate the boiler and the controller, wherein an opening is formed in fluid communication with the storage tank or the circulation line, the device further comprises an overpressure prevention member configured to close the opening, and the overpressure prevention member is configured to prevent the fluid from passing therethrough and to allow a vapor of the fluid to pass therethrough so as to reduce a pressure inside the storage tank and the circulation line.

The overpressure prevention member may include a fluororesin film attached to a surface on which the opening is formed, and a nonwoven fabric attached to the fluororesin film.

The opening may be formed on an upper surface of the storage tank, or may be formed on one surface of an auxiliary tank communicating with the circulation line.

The storage tank may be removably mounted in a storage tank mounting portion of the housing. The storage tank may include an outer wall configured to define an internal space for accommodating the fluid, and a backflow prevention means mounting member installed in a through-hole formed in the outer wall and provided with an outflow hole through which the fluid is discharged and an inflow hole through which the fluid is introduced. The storage tank mounting portion of the housing may have an inlet connected to the circulation line on an upstream side of the boiler and communicating with the outflow hole, and an outlet connected to the circulation line on a downstream side of the heat dissipation member and communicating with the inflow hole. The device may further comprise a backflow prevention means installed in the outflow hole of the backflow prevention means mounting member.

The fluid circulation type heating device according to the present invention discharges the vapor existing in the fluid circulation path to the outside and does not discharge the fluid. This makes it possible to prevent generation of an overpressure in the fluid circulation path of the heating device. In addition, even when the heating device falls, it is possible to prevent the fluid from being discharged to the outside. Moreover, it is possible to prevent external foreign substances from entering the fluid circulation path. This makes it possible to prevent damage of components or generation of bad smell which may be caused by the contamination of a fluid due to the introduction of external foreign substances.

DETAILED DESCRIPTION

Hereinafter, embodiments of the present invention will be described in detail with reference to the accompanying drawings. However, the present invention may be embodied in many different forms and the scope of the present invention should not be construed to be limited to the embodiments described below. The embodiments of the present invention are provided in order to thoroughly explain the present invention to a person having an ordinary knowledge in the related art. Thus, the shape and the like of the components shown in the drawings are exaggerated for clear description. Throughout the drawings, the components designated by the same reference numerals denote the same components.

Figure 1:
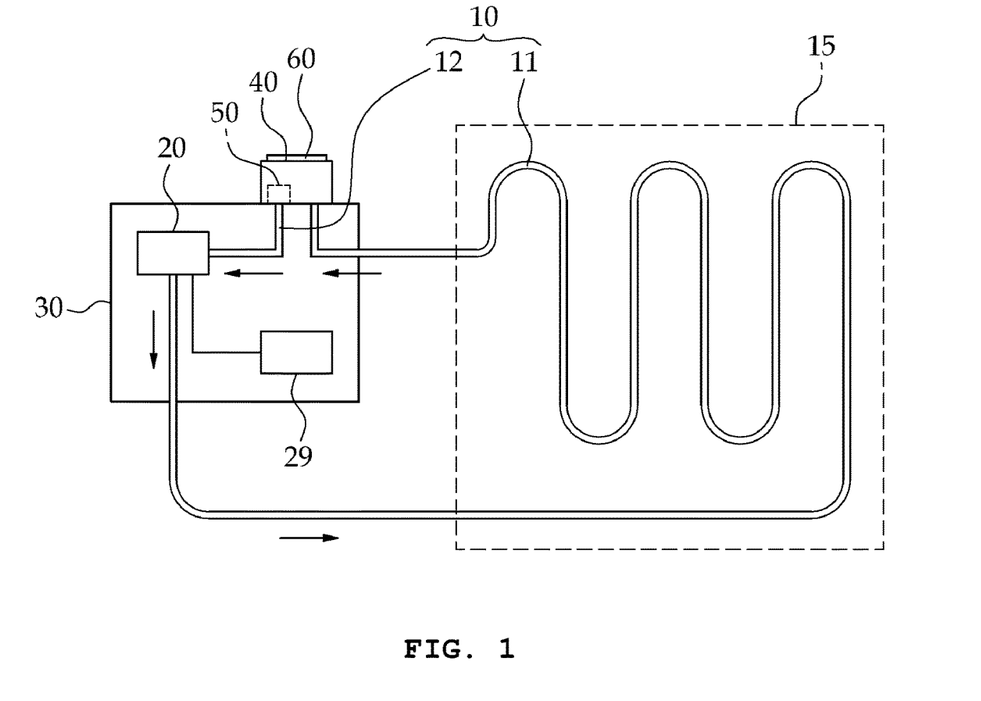
FIG. 1 is a conceptual diagram showing a fluid circulation type heating device according to an embodiment of the present invention.

FIG. 1 is a conceptual diagram showing a fluid circulation type heating device according to an embodiment of the present invention. Referring to FIG. 1, the fluid circulation type heating device according to an embodiment of the present invention includes a circulation line 10 through which a fluid circulates, a heat dissipation member 15 installed on the circulation line 10, a boiler 20 configured to heat the fluid, a controller 29 configured to control the boiler 20, a housing 30 in which the boiler 20 and the controller 29 are installed, and a storage tank 40 configured to store the fluid.

The circulation line 10 is an elongated tube through which the fluid circulates. The circulation line 10 includes a first circulation line 11 serving as a path in which the hot fluid discharged from the boiler 20 is cooled via the heat dissipation member 15 and then supplied to the storage tank 40, and a second circulation line 12 serving as a path through which the fluid discharged from the storage tank 40 is supplied to the boiler 20.

A flow velocity regulation means (not shown) may be provided in the second circulation line 12. The flow velocity regulation means is made of a porous material, for example, a nonwoven fabric or the like. The flow velocity regulation means serves to limit the flow velocity of the fluid supplied from the storage tank 40 to the boiler 20 through the second circulation line 12, thereby minimizing the noise generated by the fast flow of the fluid.

A part of the circulation line 10 is arranged inside the heat dissipation member 15 in a meandering form, and the rest of the circulation line 10 is arranged outside the heat dissipation member 15. The boiler 20, the storage tank 40 and the like are installed in the circulation line 10 disposed outside the heat dissipation member 15.

The housing 30 is generally box-shaped. The boiler 20, a part of the circulation line 10, and the controller 29 are installed inside the housing 30. A storage tank mounting portion for mounting the storage tank 40 is formed in the upper portion of the housing 30.

Figure 2:
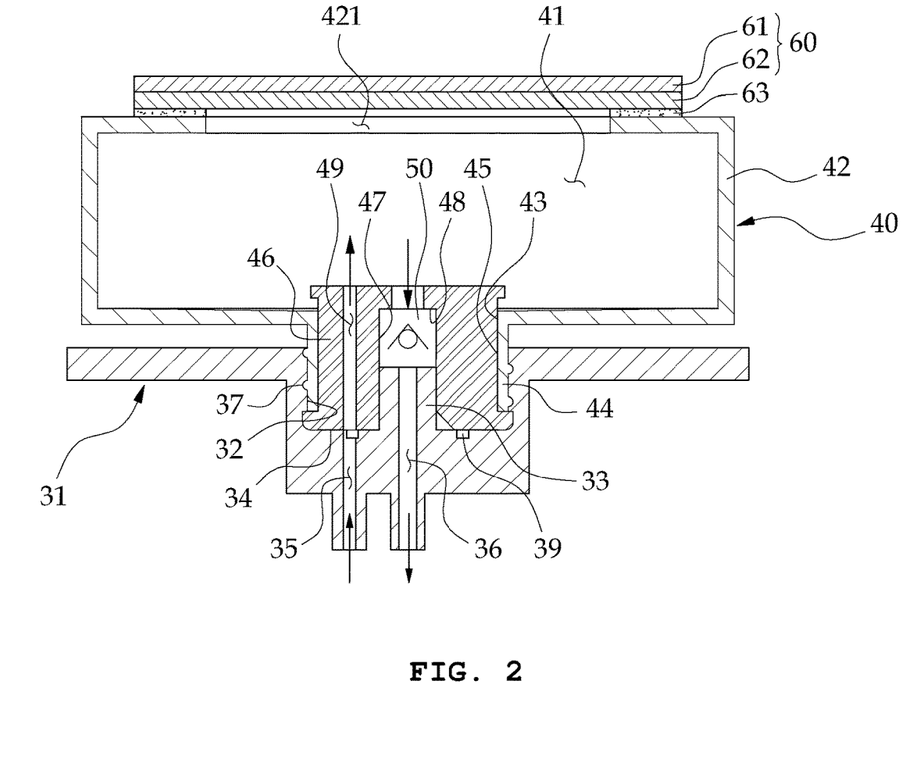
FIG. 2 is a sectional view showing a part of the fluid circulation type heating device shown in FIG. 1.
Figure 3:
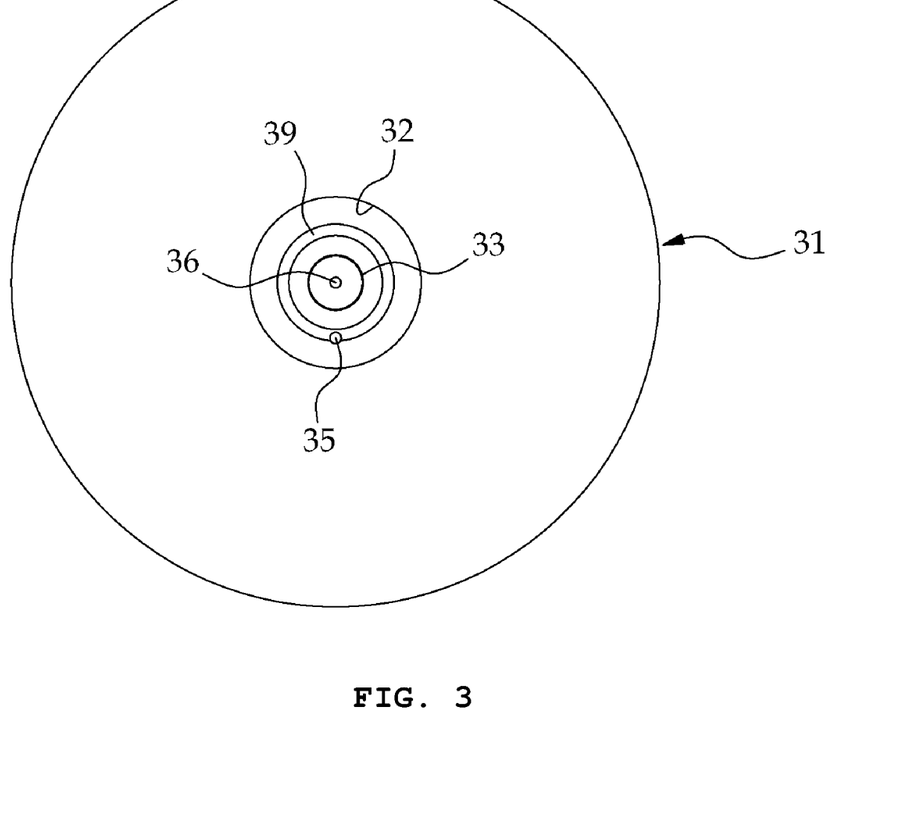
FIG. 3 is a plan view showing a storage tank mounting portion of the fluid circulation type heating device shown in FIG. 1.

FIG. 2 is a sectional view showing a part of the fluid circulation type heating device shown in FIG. 1, and FIG. 3 is a plan view showing the storage tank mounting portion of the fluid circulation type heating device shown in FIG. 1. Referring to FIGS. 2 and 3, the storage tank mounting portion 31 includes a concave groove portion 32 having a circular cross section and a projection 33 having a cylindrical shape formed in the central portion of the concave groove portion 32. The height of the projection 33 is smaller than the depth of the concave groove portion 32. An outlet 35 connected to the first circulation line 11 is formed on the bottom surface 34 of the concave groove portion 32. The outlet 35 communicates with a concentric trench 39 formed on the bottom surface 34. An inlet 36 connected to the second circulation line 12 is formed in the projection 33.

The first circulation line 11 disposed between the housing 30 and the heat dissipation member 15 is wrapped with a protection member (not shown) for preventing the burn of the user and the damage of the first circulation line 11.

A fluid such as water or oil may be used as the fluid. While not particularly limited, it is preferable to use ultrafine water (deionized water) as the fluid. This is because it is possible to minimize the breakdown of the backflow prevention means 50 or the clogging of the circulation line 10, which may otherwise be caused by foreign substances.

The heat dissipation member 15, which is a means for enclosing the first circulation line 11, serves to indirectly transfer the heat of the fluid flowing through the first circulation line 11 to the user. The heat dissipation member 15 includes an inner fabric and an outer fabric. The first circulation line 11 is embedded in the inner fabric in a zigzag form. As a method of embedding the first circulation line 11 in the inner fabric, there may be a method in which holes are first formed in the inner fabric in a zigzag form at regular intervals and the first circulation line 11 is inserted along the holes in a stitching manner.

Figure 4:
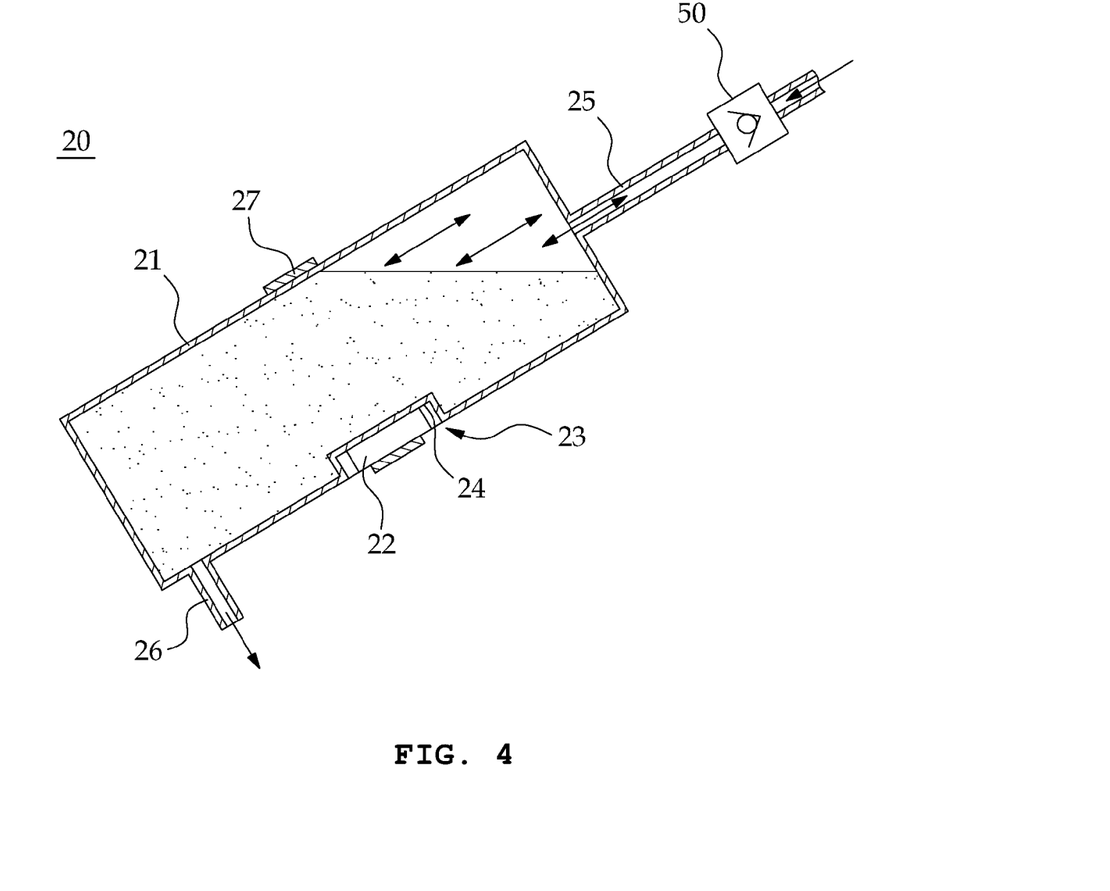
FIG. 4 is a side view of a boiler shown in FIG. 1.

FIG. 4 is a side view of the boiler shown in FIG. 1. The boiler 20 is installed in the circulation line 10 and is a means for heating the fluid flowing through the circulation line 10.

Referring to FIG. 4, the boiler 20 includes a boiler drum and a plate heater 22. The boiler drum 21 is generally cylindrical in shape and includes a heater mounting portion 23 having a planar surface 24 formed by flatly deforming the surface of the boiler drum 21 so as to facilitate the installation of the plate heater 22 and the heat transfer to the boiler drum 21. The boiler drum 21 has an inlet 25 and an outlet 26 coupled with the second circulation line 12 and the first circulation line 11, respectively. The boiler drum 21 is obliquely installed in the housing 30 such that the inlet 25 into which the fluid is introduced is higher than the outlet 26. Further, it is preferable that the outlet 26 is provided on the lower side of the boiler drum 21. As shown in FIG. 4, when the fluid in the boiler is heated and vaporized, the heated fluid is easily pushed toward the outlet 26 by the pressure of a gas.

The boiler drum 21 is preferably made of a material having a high thermal conductivity. For example, the boiler drum 21 may be made of aluminum or copper.

As the means for heating the boiler 20, various methods may be used. For example, a nichrome heating wire may be wound on the outer wall of the boiler drum 21, or a heater in the form of a plate or rod may be provided on the boiler drum 21. Although the plate heater 22 is used as the heating means in this embodiment, the heating means is not limited to the plate heater 22.

The plate heater 22 may be manufactured by forming a pattern serving as a resistor on one surface or both surfaces of a ceramic plate and then forming protective layers for the protection of the resistor pattern on the upper and lower surfaces of the ceramic plate. When an electric current is allowed to flow through the resistor pattern of the plate heater 22, heat is generated in the plate heater 22.

The boiler 20 further includes a clamp 27 for coupling the plate heater 22 to the boiler drum 21. When the clamp 27 is removed, the plate heater 22 can be easily disassembled from the boiler drum 21. This makes it possible to easily cope with the breakdown of the plate heater 22, etc.

The heat transferred to the boiler drum 21 heats the fluid introduced into the boiler drum 21, thereby expanding and vaporizing some of the fluid. As the fluid is expanded or vaporized, the pressure inside the boiler drum 21 increases and the fluid flows toward the outlet 26 of the boiler drum 21. The flow toward the inlet 25 of the boiler drum 21 is blocked by the backflow prevention means 50.

When the electric current flowing through the plate heater 22 is cut off, heat is no longer transferred to the boiler drum 21. The boiler drum 21 is exposed to the outside except for a part of the surface coupled with the plate heater 22. The boiler drum 21 is rapidly cooled because it is made of a material having a high thermal conductivity. The vaporized fluid remaining in the boiler drum 21 contracts again due to the cooling of the boiler drum 21. The pressure is reduced due to the corresponding large reduction in volume and the vacuum formation, whereby the fluid flows into the boiler drum 21 through the inlet 25 of the boiler drum 21.

The controller 29 serves to apply ON and OFF signals to a power source connected to the plate heater 22 according to a predetermined program. By adjusting the holding time of the ON signal and the holding time of the OFF signal, the controller 29 adjusts the fluid heating time and the fluid cooling time. When the fluid is heated, the temperature and pressure of the fluid increase. The increase in the pressure of the fluid causes the fluid to flow toward the heat dissipation member 15. As the fluid in the boiler drum 21 is discharged through the outlet 26 due to the vaporization pressure, the pressure inside the boiler drum 21 generated during the vaporization of the fluid is not maintained. Thus, the fluid in the storage tank 40 or the pushed-out fluid flows back into the boiler drum 21. Therefore, by adjusting the holding time of the ON signal and the holding time of the OFF signal, it is possible to control the pumping speed and the fluid temperature.

Referring again to FIG. 2, the storage tank 40 includes an outer wall 42 configured to define an inner space 41 for accommodating the fluid, a circular through-hole 43 formed in the bottom portion of the outer wall 42, and a protruding portion 44 protruding downward along the through-hole 43. The storage tank 40 further includes a backflow prevention means mounting member 46 provided in a mounting space 45 surrounded by the protruding portion 44.

The backflow prevention means mounting member 46 is formed in a substantially cylindrical shape. An outflow hole 47 communicating with the inlet 36 disposed in the storage tank mounting portion 31 to supply the fluid to the boiler 20 is formed in the central portion of the backflow prevention means mounting member 46. The backflow preventing means 50 is provided in the outflow hole 47. The backflow prevention means 50 is a means for limiting the fluid to flow only in one direction in the circulation line 10. In other words, the backflow prevention means 50 is a means for preventing the fluid from flowing into the storage tank 40 through the outflow hole 47. The backflow prevention means 50 may be various kinds of check valves including a ball check valve, namely a lift check valve, a swing check valve, a membrane check valve and the like. In addition, a stopper protrusion 48 for preventing the backflow prevention means 50 from being pushed by the pressure may be formed in the outflow hole 47.

In the case where a polymer material having elasticity such as silicone rubber or the like is used as the material of the backflow prevention means mounting member 46, there is an advantage that the backflow prevention means 50 can be fixed by fitting the backflow prevention means 50 into the outflow hole 47, and the space between the backflow prevention means 50 and the outflow hole 47 can be sealed.

An inflow hole 49 communicating with the outlet 35 of the storage tank mounting portion 31 so that the low-temperature fluid which has transferred heat to the heat dissipation member 15 flows into the inflow hole 49 is formed in a region around the outflow hole 47 of the backflow prevention means mounting member 46. The number of the inflow holes 49 may be changed as needed. The fluid flowing into the concave groove portion 32 through the outlet 35 passes through the trench 39 of the bottom surface 34 of the concave groove portion 32 and the inflow hole 49 and then flows into the internal space 41 of the storage tank 40. The trench 39 is necessary for smoothly ensuring a flow path when the storage tank 40 is rotationally coupled to the storage tank mounting portion 31.

The storage tank 40 is threadedly coupled to the storage tank mounting portion 31. At this time, the space between the wall surface of the concave groove portion 32 and the protruding portion 44 is sealed. If necessary, a separate sealing means such as an O-ring or the like may be provided between the protruding portion 44 and the concave groove portion 32.

When the storage tank 40 is threadedly coupled to the storage tank mounting portion 31, the projection 33 of the storage tank mounting portion 31 is fitted into the outflow hole 47 of the backflow prevention means mounting member 46. Since the backflow prevention means mounting member 46 has elasticity, the space between the protrusion 33 and the outflow hole 47 is sealed.

On the upper surface of the storage tank 40, an opening 421 communicating with the outside is formed. An overpressure prevention member 60 for blocking the opening 421 is attached to the upper surface of the storage tank 40. The overpressure prevention member 60 does not allow the fluid to pass therethrough but allows the vapor of the fluid to pass therethrough. Thus, the overpressure prevention member 60 serves to lower the pressure of the storage tank 40 and the circulation line 10. The overpressure prevention member 60 may include a film having pores of such a size that the pores cannot pass the fluid but can pass the vapor of the fluid.

For example, as shown in FIG. 2, the overpressure prevention member 60 may include a fluororesin film 62 attached to the upper surface of the storage tank 40 having the opening 421 and a nonwoven fabric 61 attached to the fluororesin film 62. The fluororesin film 62 may be produced by forming a film of fluororesin fibers having a small diameter and stretching the film. When the film made of the fluororesin fibers is stretched in an appropriate manner, the fibers are elongated and become thinner. The spacing between the fibers is also adjusted. By properly adjusting the spacing, it is possible to set the spacing to such a size that the spacing cannot pass the fluid but can pass the vapor of the fluid. Since such a film is too thin and inconvenient to handle, it is preferable that the film is used by attaching the same to a cloth such as a nonwoven fabric or the like.

A double-sided tape 63 for bonding the overpressure prevention member 60 to the upper surface of the storage tank 40 may be attached to the periphery of the lower surface of the fluororesin film 62. In addition, the overpressure prevention member 60 may be coupled to the storage tank 40 using an ultrasonic welding method or an adhesive agent.

While not shown, a water level sensor capable of measuring the level of the fluid stored in the storage tank 40 may be installed in the storage tank 40. The water level sensor serves to inform whether or not the fluid needs to be replenished.

Hereinafter, the operation of the fluid circulation type heating device according to an embodiment of the present invention will be described.

First, the storage tank 40 containing ultrapure water is mounted to the storage tank mounting portion 31 of the housing 30. At this time, the backflow prevention means 50 provided in the outflow hole 47 of the storage tank 40 is brought into close contact with the inlet 36 of the storage tank mounting portion 31.

When the fluid circulation type heating device is operated, the plate heater 22 of the boiler 20 is operated to heat the fluid stored in the boiler drum 21. The heated fluid is expanded and partially vaporized. The expansion and vaporization of the fluid increases the pressure inside the boiler drum 21 and pushes the fluid inside the boiler drum 21. The backflow prevention means 50 is provided in the outflow hole 47 of the storage tank 40 so that the fluid inside the boiler drum 21 cannot flow toward the inlet 25 of the boiler drum 21 (toward the outflow hole of the storage tank) and flows out toward the outlet 26.

The fluid flowing out toward the outlet 26 flows along the first circulation line 11 disposed inside the heat dissipation member 15 and transfers heat to the heat dissipation member 15, whereby the fluid is cooled. The cooled fluid returns to the storage tank 40. The fluid in the storage tank 40 cannot flow toward the boiler 20 when the boiler 20 is in a heated state. This is because the pressure on the side of the boiler 20 is higher.

When the power source connected to the plate heater 22 of the boiler 20 is cut off or when the amount of heat generated by the plate heater 22 is reduced, the interior of the boiler drum 21 is cooled by the ambient air. The fluid stored in the storage tank 40 is supplied into the boiler drum 21 when the interior of the boiler drum 21 is sufficiently cooled and the pressure inside the boiler drum 21 is sufficiently lower than the pressure inside the storage tank 40. The fluid introduced into the boiler drum 21 sharply lowers the temperature inside the boiler drum 21, which accelerates the suction of the fluid. At this time, the flow velocity regulation means provided inside the second circulation line 12 regulates the flow suction velocity to be slowed down, thereby minimizing the noise generated in the fluid suction process.

When the plate heater 22 of the boiler drum 21 is operated again, the fluid circulates through the above-described process. If the pressure in the storage tank 40 rises excessively in the course of heating and circulating the fluid, the water vapor is discharged to the outside through the overpressure prevention member 60, thereby reducing the pressure in the storage tank 40 and the circulation line 10.

In this embodiment, when the backflow prevention means 50 is broken, it is possible to simply replace the backflow prevention means 50 by replacing the storage tank 40 threadedly coupled to the housing 30 with a new storage tank 40. Since the ultrapure water is difficult to be purchased by a general user, if the fluid circulation type heating device is managed in such a way that the user purchases a new storage tank storing ultrapure water and periodically replacing the storage tank 40 with a new one, it is possible to periodically replace the backflow prevention means 50 with a new one. This makes it possible to prevent the breakdown of the backflow prevention means 50.

Figure 5:
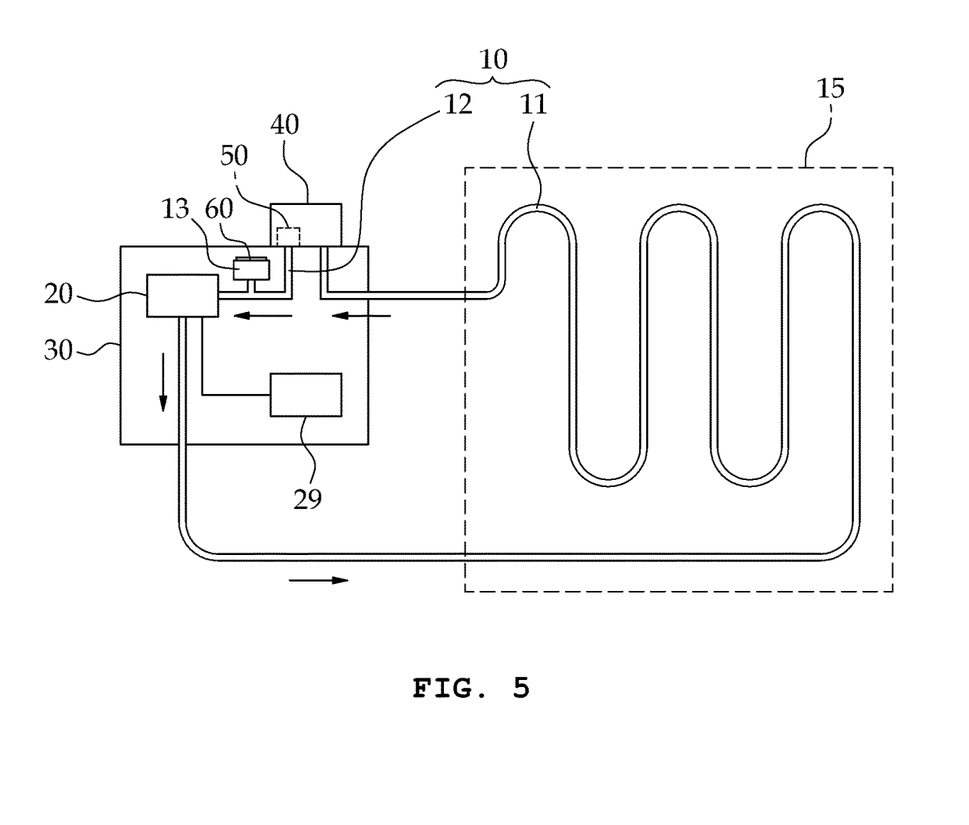
FIG. 5 is a conceptual diagram showing a fluid circulation type heating device according to another embodiment of the present invention.

FIG. 5 is a conceptual diagram showing a fluid circulation type heating device according to another embodiment of the present invention. The fluid circulation type heating device shown in FIG. 5 is partially the same as the fluid circulation type heating device shown in FIG. 1. Therefore, the same components are not described again in order to omit repetition. In this regard, the same reference numerals are used to designate the same detailed members.

Figure 6:
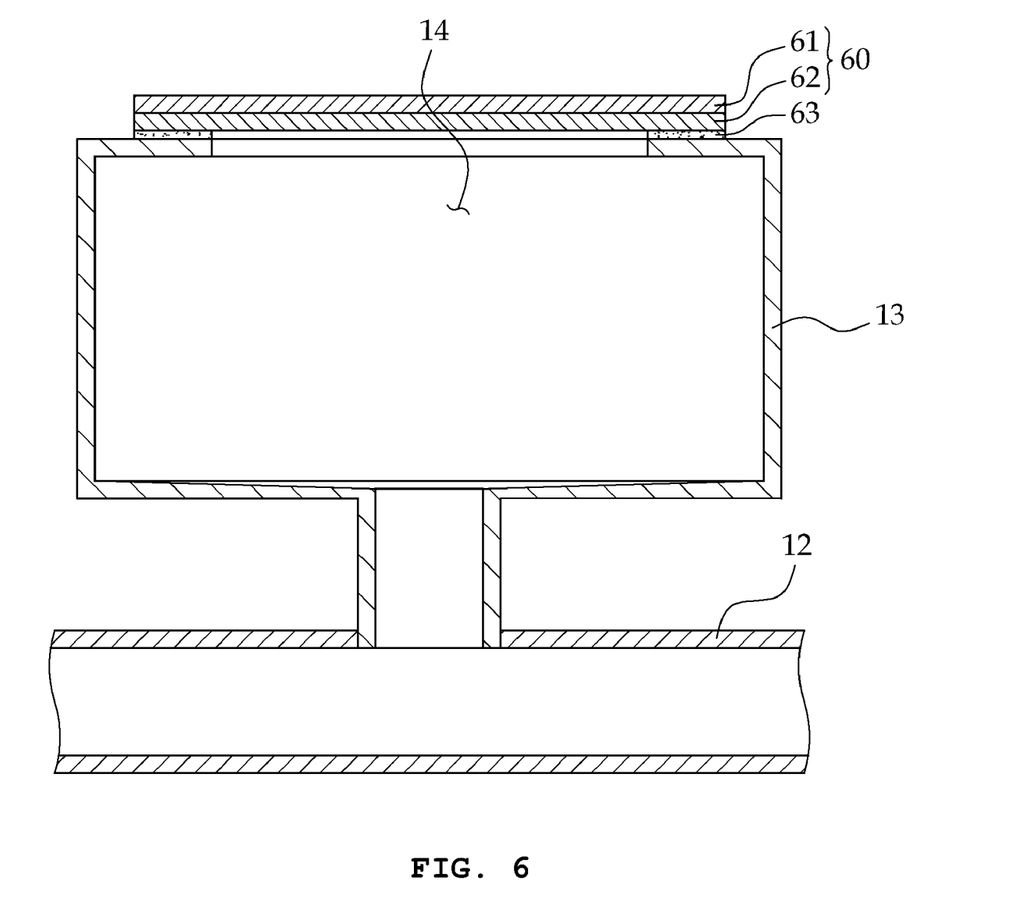
FIG. 6 is a sectional view showing a part of the fluid circulation type heating device shown in FIG. 5.

The unique feature of this embodiment lies in that the overpressure prevention member 60 is not attached to the storage tank 40 but is attached to the opening 14 of an auxiliary tank 13 connected to the circulation line 10. As shown in FIG. 6, the auxiliary tank 13 is in the form of a small water bottle communicating with the circulation line 10. An opening 14 communicating with the outside is formed in the auxiliary tank 13. The overpressure prevention member 60 is attached to the surface of the auxiliary tank 13 on which the opening 14 is formed, thereby closing the opening 14.

The auxiliary tank 13 may be installed in the circulation line 10 between the storage tank 40 and the boiler or in the circulation line 10 between the heat dissipation member 15 and the storage tank 40.

While the present invention has been described with reference to the preferred embodiments, the aforementioned embodiments are nothing more than examples. Those skilled in the art will be able to appreciate that various modifications, changes and substitutions may be made without departing from the technical idea of the present invention and the claims. It is to be understood that such modifications, changes and substitutions fall within the scope of the present invention.

In the embodiment shown in FIG. 2, the backflow prevention means mounting member 46 is provided separately. However, the backflow prevention means mounting member may be integrally coupled to the storage tank. In addition, although the elastic polymer material is used as the backflow prevention means mounting member, it is also possible to use a backflow prevention means mounting member made of a rigid material. The backflow prevention means mounting member may be sealed by fitting the same. A separate sealing means such as an O-ring or the like may be used.

What is claimed is:

1. A fluid circulation type heating device comprising:
a circulation line;
a heat dissipation member installed on the circulation line;
a boiler configured to heat and expand a fluid;
a storage tank configured to store the fluid and supply the fluid to the boiler and having a first opening;
an auxiliary tank installed on the circulation line between the storage tank and the boiler or between the heat dissipation member and the storage tank, the auxiliary tank having a second opening;
a controller configured to control the boiler;
a housing configured to accommodate the boiler and the controller; and
an overpressure prevention member closing the first opening and configured to prevent the fluid from passing therethrough and to allow a vapor of the fluid to pass therethrough so as to reduce a pressure inside the storage tank and the circulation line.

2. The device of claim 1, wherein the overpressure prevention member includes a fluororesin film attached to a surface on which the first opening is formed, and a nonwoven fabric attached to the fluororesin film.

3. The device of claim 1, wherein the first opening is formed on an upper surface of the storage tank.

4. The device of claim 1, wherein the storage tank is removably mounted in a storage tank mounting portion of the housing,
wherein the storage tank includes an outer wall configured to define an internal space for accommodating the fluid, and a backflow prevention means mounting member installed in a through-hole formed in the outer wall and provided with an outflow hole through which the fluid is discharged and an inflow hole through which the fluid is introduced,
the storage tank mounting portion of the housing has an inlet connected to the circulation line on an upstream side of the boiler and communicating with the outflow hole, and an outlet connected to the circulation line on a downstream side of the heat dissipation member and communicating with the inflow hole, and the device further comprises a backflow prevention means installed in the outflow hole of the backflow prevention means mounting member.

5. A fluid circulation type heating device comprising:
a circulation line;
a heat dissipation member installed on the circulation line;
a boiler configured to heat and expand a fluid;
a storage tank configured to store the fluid and supply the fluid to the boiler;
an auxiliary tank installed on the circulation line between the storage tank and the boiler or between the heat dissipation member and the storage tank, the auxiliary tank having an opening;
a controller configured to control the boiler;
a housing configured to accommodate the boiler and the controller; and
an overpressure prevention member closing the opening of the auxiliary tank and configured to prevent the fluid from passing therethrough and to allow a vapor of the fluid to pass therethrough so as to reduce a pressure inside the circulation line.

6. The device of claim 5, wherein the overpressure prevention member includes a fluororesin film and a nonwoven fabric attached to the fluororesin film.

7. The device of claim 5, wherein the opening is formed on an upper surface of the auxiliary storage tank.

* * * * *